United States Patent [19]

Balsbaugh

[11] Patent Number: 4,919,080

[45] Date of Patent: Apr. 24, 1990

[54] SYSTEM FOR CONCENTRATING ANIMALS IN INDIVIDUAL STALLS

[75] Inventor: Richard K. Balsbaugh, Quincy, Ill.

[73] Assignee: Moorman Manufacturing Company, Quincy, Ill.

[21] Appl. No.: 425,742

[22] Filed: Oct. 23, 1989

[51] Int. Cl.⁵ ............................................. A01K 1/02
[52] U.S. Cl. .......................................... 119/20; 119/27
[58] Field of Search ....................... 119/15, 20, 27, 82; D 30/108, 113

[56] References Cited

U.S. PATENT DOCUMENTS

| | | |
|---|---|---|
| 2,255,806 | 9/1941 | Overson . |
| 2,764,127 | 9/1956 | Newman . |
| 3,203,033 | 8/1965 | Banse . |
| 3,237,600 | 3/1966 | Behrens et al. . |
| 3,412,711 | 1/1968 | Martensson et al. . |
| 3,734,059 | 5/1973 | Rodrigues ........................ 119/27 |
| 3,804,065 | 4/1974 | Coates ............................. 119/20 |
| 3,986,481 | 10/1976 | Gloggler et al. ................. 119/27 |

FOREIGN PATENT DOCUMENTS

| | | | |
|---|---|---|---|
| 2518643 | 11/1976 | Fed. Rep. of Germany ........ 119/27 |
| 632326 | 11/1978 | U.S.S.R. ............................. 119/20 |
| 1130283 | 12/1984 | U.S.S.R. ............................. 119/20 |

OTHER PUBLICATIONS

J. Anim. Sci. 1982, 55, p. 194, McFarlane et al., Gilts in Five Gestation Environments.
J. Anim. Sci. 1983, 56, p. 139 McFarlane and Curtis, Behavior of Gilts in a Turn-Around Gestation Crate.
Univ. of Ill. Dec., 1983, pp. 1-4, McFarlane and Curtis, Behavior of Mated Gilt in a Turn-Around Festation Crate.
Pig New and Information, March, 1986, vol. 7, No. 1, pp. 33-38, Petherick et al., A Review of Housing Systems for Non-Lactating Sows.
J. Anim. Sci., 1988 66, p. 241, Glone et al., Reproductive Performance and Immune Function of Two Types of Gilts in Four Gestation Environments.
J. Anim. Sci. 1988 66 pp. 326-333, McFarlane, Boe and Curtis, Turning and Walking by Gilts in Modified Gestation Crates.

*Primary Examiner*—John Weiss
*Attorney, Agent, or Firm*—Lockwood, Alex, FitzGibbon & Cummings

[57] ABSTRACT

A system for comfortably concentrating in individual stalls a group of elongated four-legged animals which as a group have generally the same length and breadth, particularly, gestating sows. The system comprises at least one row of stalls or compartments arranged side-by-side. Each adjoining pair of the stalls share a common vertical divider or partition one end of which is stationary or fixed with the remainder being pivotally attached so as to be swingable from side to side. Preferably, the extent of swinging is limited by a length of chain. The width of each stall measured between adjacent stationary ends of the dividers is sufficient to comfortably accommodate the breadth of the animals either standing or lying but insufficient to accommodate their lengths. The length of each stall is sufficient to comfortably accommodate the lengths of the animals either standing or lying. The widened space formed between the swingable divider portions of a stall on being forced apart by an occupying animal is sufficient to allow the animal to turn around in its stall.

12 Claims, 3 Drawing Sheets

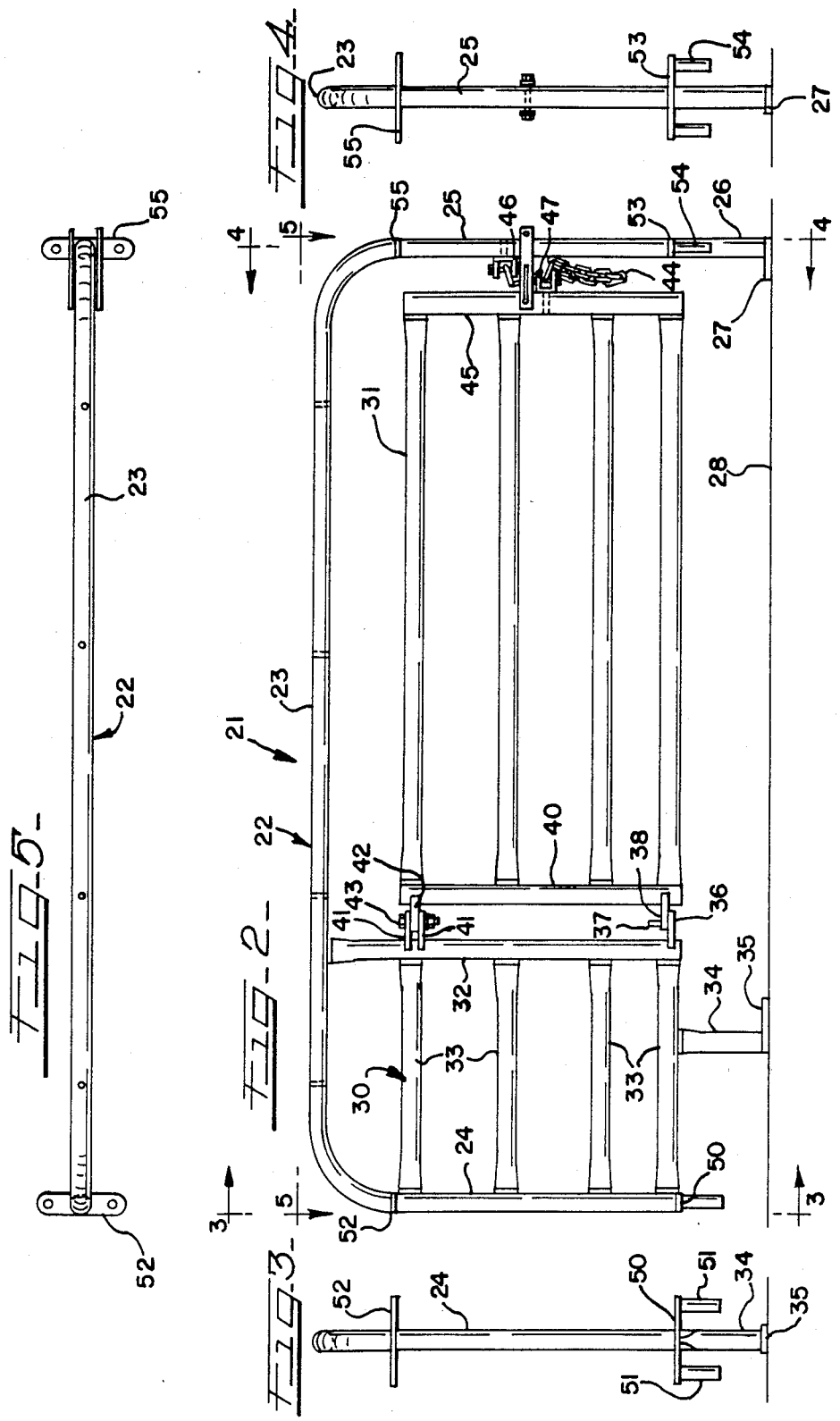

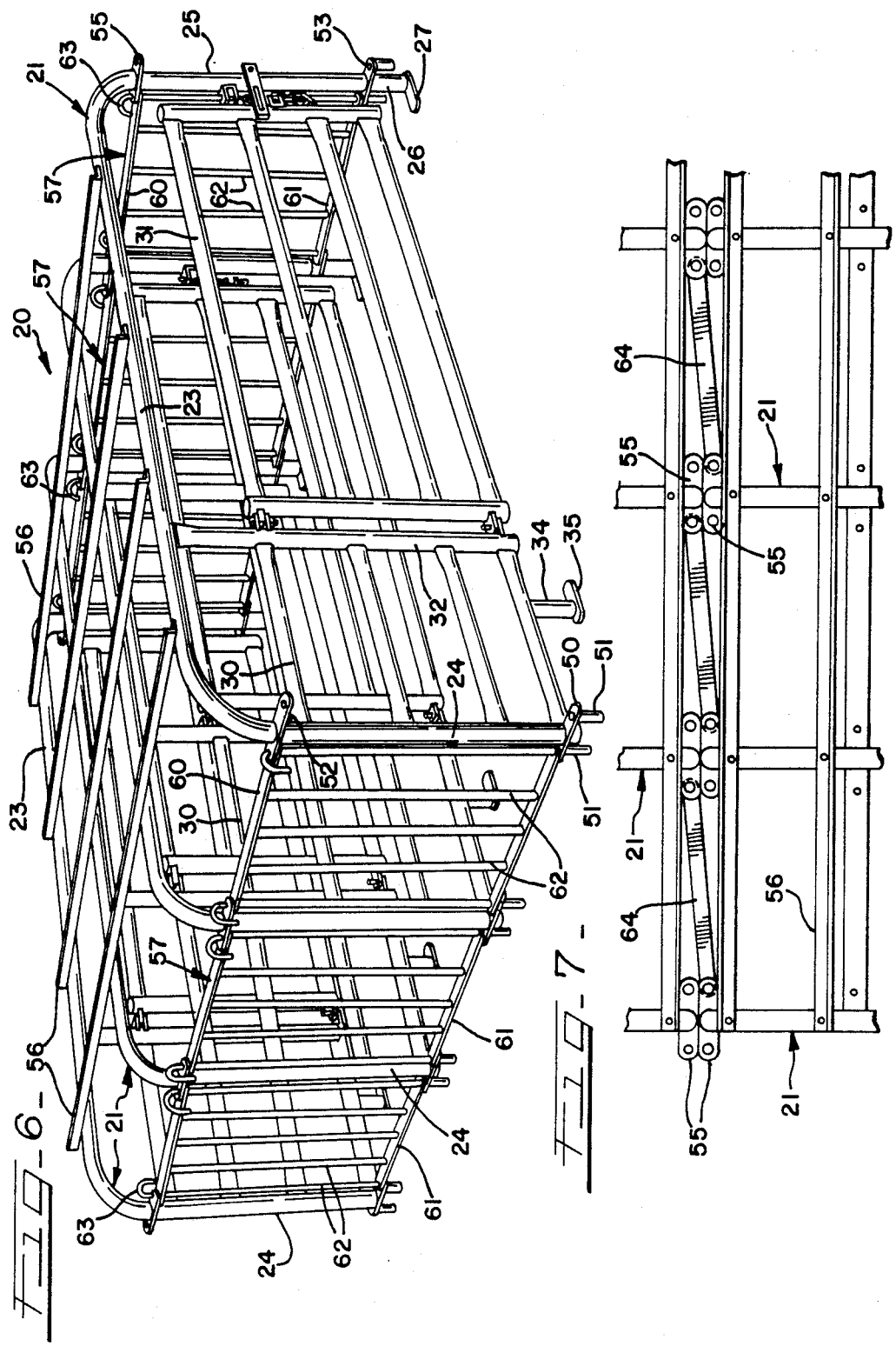

4,919,080

SYSTEM FOR CONCENTRATING ANIMALS IN INDIVIDUAL STALLS

FIELD OF THE INVENTION

This invention relates generally to systems for comfortably concentrating or holding groups of four-legged animals in individual stalls. At the present time it appears that the invention will have its greatest use as a system for holding gestating sows in comfortable concentrations. However, the invention can be used advantageously for likewise holding other four-legged animals.

BACKGROUND OF THE INVENTION

It is a common practice in the pork industry to confine sows during their gestation periods. For economic and practical reasons, it has been the practice to individually confine groups of the animals in the smallest floor area or space that will suffice. Heretofore, it has been a wide spread practice to confine gestating sows in individual enclosures arranged side-by-side in rows with each enclosure being wide and long enough to accommodate the sows when either standing or lying down, but not wide or long enough to allow the animals to turn around or have appreciable body movements. It has been recognized that such confinement systems are subject to several significant drawbacks and disadvantages. For example, by reason of their lack of adequate body movement, the animals tend to have leg weakness and lameness and a tendency toward other health problems associated with lack of exercise. Further, due to restricted body movement animal waste tends to accumulate in the enclosure occupied by an animal's hindquarters resulting in impaired hygiene with associated increase in incidence of cystitis and vaginal infections due to the animal's sitting and lying in manure.

SUMMARY OF THE INVENTION

Without requiring increase in floor space, the compartment systems of the present invention permit the concentrated animals to turn around in their individual stalls thereby eliminating or substantially reducing the drawbacks and disadvantages of conventional confinement systems while achieving a number of important advantages and results, including: increase in herd productivity; behavioral thermoregulation; optional placement of feed and water sources at opposite ends of the stalls thereby promoting hygienic conditions; promotion of inter-action and socializing between animals; substantial increase in body movement with attendant health benefits; permits avoiding anti-social animals; and permitting each animal to be led into and out of its stall through the same end.

The compartmentation systems of the present invention are characterized in having at least one row of stalls arranged side-by-side with each pair of adjoining stalls sharing a common vertical divider or partition. Each divider has a fixed or stationary portion and a pivoted or articulated portion which is swingable from side-to-side. The width of the stalls when measured between the stationary portions is such as to comfortably accommodate the breadth of the animals while the length of the stalls is such as to comfortably accommodate the length of the animals. However, since a portion of each side of a stall is swingable from side-to-side, an animal occupying the stall can spread or force the swingable portions apart and thereby temporarily enlarge one end of the stall sufficiently to permit the animal to easily turn around therein.

For a more complete understanding of the nature and scope of the invention reference may be had to the following detailed description of a presently preferred embodiment taken in conjunction with the accompanying drawings wherein:

BRIEF DESCRIPTION OF THE DRAWINGS

FIG. 2 is a side elevational view of an articulated divider or partition which can be used as the basic component of an animal compartmentalized holding system embodying the invention;

FIG. 3 is an end elevational view taken on line 3—3 of FIG. 2;

FIG. 4 is an end elevational view taken on line 4—4 of FIG. 2;

FIG. 5 is a top plan view taken on line 5—5 of FIG. 2;

FIG. 6 is a fragmentary perspective view of a compartmental system fabricated by using a plurality of the articulated dividers shown in FIGS. 2-5 together with a plurality of removable end gates and a plurality of top tie members; and, FIG. 7 is a fragmentary top plan view showing the compartmental system of FIG. 6 coupled to a corresponding system.

Referring to FIG. 1, a compartmentalized holding system is indicated generally at 5 comprising back-to-back rows 6 and 7 of side by-side stalls for holding concentrations of four-legged animals, which as a group have approximately the same lengths and breadths. For practical purposes the rows 6 and 7 may be considered to be identical. The back-to-back or confronting arrangement offers certain practical advantages from the standpoint of tending and maintaining the system as will be mentioned below. Walkways 8-8 extend along each of the rows 6 and 7 which provide access to the stalls and which may be used for the introduction and removal of animals, delivery of feed, removal of manure, etc.

Figure 1:
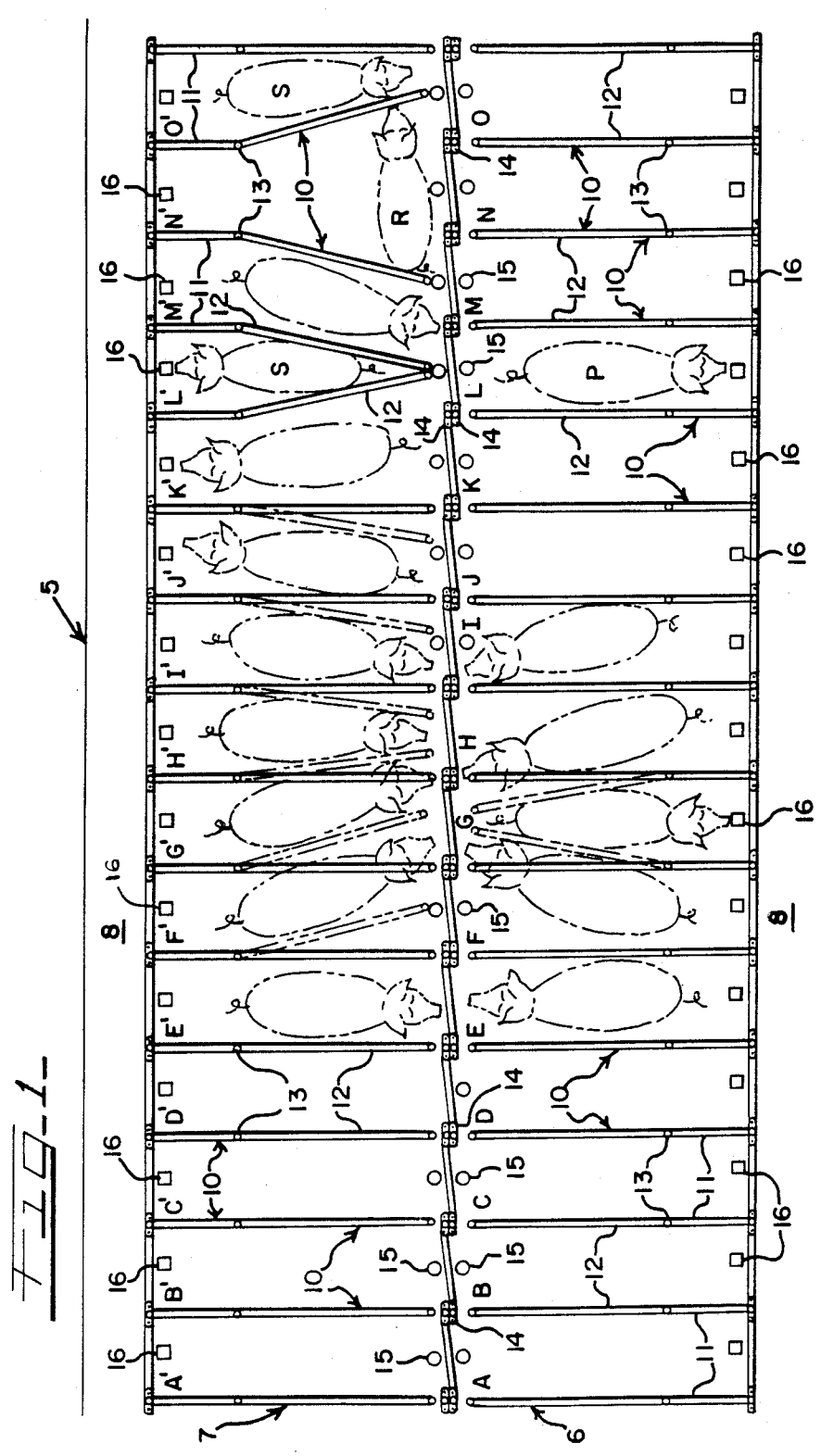
FIG. 1 is a top plan diagrammatic view of an animal compartmentalized holding system embodying the invention.

Each of the rows 6 and 7 contains 15 individual stalls, the stalls in row 6 being indicated by the letters A through O and the stalls in row 7 by the letters A' through O'. Each of the stalls A—O and A'—O' includes a vertical divider or partition with the partitions for adjoining stalls being indicated generally at 10-10. It will be seen at each of the stalls which are side-by-side share a common divider 10. Each of the dividers 10 has a relatively short stationary or fixed end section 11 and a swingable or articulated section 12. The swingable sections 12 are pivotally connected to and mounted on the adjacent ends of the fixed sections 11 at pivot points 13-13. Preferably, means are provided for limiting the extent to which each of the swingable sections 12 can be swung from side-to-side. Such means conveniently and desirably takes the form of short lengths of chain 14-14 connected at one end to the distal end of a swinging section 12 and connected at the opposite end to a fixed element of the installation.

Each of the stalls is provided with an automatic source of free-choice water at one end as indicated at 15-15 and a feeder 16-16 at the opposite end. This separation of water and feed offers certain practical advantages as will be pointed out below.

Preferably suitable stop means (not shown) is provided for each of the stalls so that each of the swingable divider sections 10 can be locked against swinging action. An animal P, such as a gestating sow is shown in stall G feeding from the feeder 16. Assuming that the swingable sections 12 of the dividers 10 forming the sides of stall L are secured against swinging, it will be seen that the width of the stall L comfortably accommodates the width of the sow P while the length of the stall L comfortably accommodates the length of this animal. Further, sow P can comfortably lie, sit or stand up in its stall L and can also move forwards and backwards. However, the stall L with sections 12 locked from swing is too narrow to permit animal P to turn around in it.

Referring to stall N' the swingable divider sections 12 therefor are shown as spread or forced apart by the animal R to the maximum extent permitted which is sufficient to allow the animal R to stand crosswise to the length of the stall N' and thereby turn around freely. It will be seen that when the animal R is in the transverse position shown in stall N' its head can come close to the head of animals in stall O' so as to permit socializing between these two animals. Such socializing has advantages as will be pointed out below.

While the stall N' is shown with its space temporarily expanded to the maximum extent permitted, the stall L' shown with its space being temporarily restricted to the minimum extent by reason of its swingable sections 12-12 being brought together at their distal ends. However, there is still room in the residual minimum space in stall L' to permit the animal S therein to stand and lie comfortably and have access to its feeder 16.

The system 5 permits groups of the compartmentalized animals to socialize such as the eight animals in stalls F, G, H, I, F', G', H' and I'. On the other hand, the system 5 allows the animals to avoid a nearby hostile animal.

A comfortable retention system for four-legged animals embodying the principles of the system 5 in FIG. 1 can be economically achieved in actual practice utilizing a minimum of components as will be described in connection with the confinement system installation shown in FIGS. 2–7 to which reference is now made.

In FIG. 6 a portion of such retention system is indicated generally at 20 which embodies the features and principles of the present invention as described in connection with the embodiment diagrammatically shown in FIG. 1. A key component of the system 20 is a plurality of vertical stall dividers indicated generally at 21-21. The details of construction of one of the dividers 21 are shown in FIGS. 2-5. The divider 21 has an inverted U-shaped frame member 22 having an elongated horizontal top rail 23 from the opposite ends of which vertical legs 24 and 25 depend. The leg 25 is longer than the leg 24 in that at its bottom it has a foot portion 26 with a bottom flange 27 which rests on the floor indicated at 28.

The stationary frame member 22 supports the articulated divider or partition which includes a relatively short fixed section 30 on which is pivotally supported a swingable section 31. In addition to vertical leg 24 of the frame member 22 the fixed section 30 comprises a post 32 which is welded or otherwise secured at its upper end to the underside of the top rail 23. A plurality of crosspieces 33-33 interconnect the vertical leg 24 and post 32. A support leg 34 is secured at its upper end to the underside of the bottom crosspiece 33 and as a flange or plate 35 at its lower end which rests on the floor 28.

The swingable section 31 is supported on the post 32 by upper and lower hinges which may be of conventional design. For example, the bottom hinge may consist of an ear 36 welded or otherwise secured to the post 32 and carrying a vertical pen 37 which projects upwardly through an opening in an ear 38 projecting from the post 40 of the swingable section 31. The upper hinge may comprise a pair of spaced ears 41-41 projecting from the post 32 and in between which an ear 42 extends which is carried by the post 40. The ears 41 and 42 are provided with registering apertures for reception of a nut and bolt fastener 43. The swingable section 31 may be readily installed by lowering the ear 38 over the pen 37 while inserting the ear 42 between the ears 41. Thereafter the bolt portion of the fastener 43 is inserted and the nut is screwed in place. It will be understood that other forms of hinges may be utilized as desired.

It will be see that the swingable section 31 of the divider 21 can swing in opposite directions when engaged by the body of an animal. In order to limit the extent to which the section 31 can swing so that the enclosed animals cannot leave their respective stalls a restraining or limiting means is provided which may take the form of a length of chain 44. One end of the chain 44 is secured to the distal end of the divider 31 in the form of the vertical post 45 while the other end of the chain 44 is secured to the inside of the vertical leg 25. The opposite ends of each chain 44 may be secured in place by a pair of clevises 46 and 47.

The vertical leg 24 of the frame member 22 is provided adjacent the bottom with a horizontal bracket 50 the opposite ends of which are apertured with sleeve-like sockets 51-51 secured to the underside. Adjacent its upper end the leg 24 is provided with a bracket 52 which is apertured at opposite ends. As will be pointed out in connection with FIG. 6 the brackets 50 and 52 serve to support removable gates for closing the end of a stall formed between two adjacent posts 24.

Likewise, the opposing vertical leg 25 of the frame member 23 is provided with a bottom bracket 53 from the opposite apertured ends of which are supported a pair of downwardly extending sleeve-like socket members 54-54. At the top of the post 25 a bracket 55 is mounted. The brackets 53 and 54 serve to support removable gates for closing the end of a pen between adjacent vertical legs 25.

If desired, the sockets 51-51 and 54-54 may be replaced by brackets corresponding to brackets 50 and 53, respectively, spaced below brackets 50 and 53.

Referring to FIG. 6, the vertical dividers 21 are shown secured together at the tops thereof by a plurality of transversely extending frame members 56-56 which may take the form of lengths of angle iron, rods or pipes. It will be understood that the cross members 56 and the transverse horizontal top rails 23 of the dividers 21 may be suitably apertured and secured together in known manner by a plurality of nut and bolt fasteners extending through the apertures. This method of securement permits the confinement system 20 to be readily installed and removed, enlarged or diminished as desired.

The ends of the stalls between adjacent vertical posts 24-24 and 25-25 may be closed by removable gates 57-57. These gates have upper and lower cross members 60 and 61, respectively, between which vertical posts 62 extend. The cross members 60 and 61 project at their opposite ends so as to rest on the adjacent upper and lower brackets 52-50 and 55-53 mounted on posts 24 and 25, respectively. A pair of elongated pins or rods 63-63 with hook shaped upper ends are inserted in the registering apertures in the respective brackets 50-52 and 53-55 and the projecting ends of the cross members 60 and 61. It will be seen that each gate 57 may be readily removed by simply withdrawing its pins 63.

When two rows of stalls are secured together in opposing alignment as shown in FIG. 7 only a single set of removable gates 64 is required to both close the juxtaposed ends of aligned stalls and secure the duplex installation together. Thus, the gates 64 are secured at one end to a pair of upper and lower brackets 52-50, respectively, on one of the posts 24 while the opposite end of the gate 64 is removably connected to a pair of upper and lower brackets 55-53, respectively, on a post 25 of the opposing aligned stall.

Some of the following advantages nd contributions of the retention system 20 have been previously referred to in connection with the confinement system 5 as shown diagrammatically in FIG. 1. Since the interior space of each stall or compartment can be temporarily enlarged by its occupying animal so as to permit the animal to turn around and face in the opposite direction, the animal can indulge in a considerably greater range of body movement. The temporary enlargement of a stall by its occupant will be at the expense of the animal or animals in adjacent stalls but without cramping or unduly confining the occupying animals in those stalls when the available space therein is temporarily reduced. As a result of the variable space sharing between adjacent animals, the health and hygiene of the animals tends to be noticeably improved. Socializing between an increased number of animals is permitted which tends to enhance the well-being of the animals. Anti-social animals can be avoided. Leg weakness or lameness due to confinement is eliminated or substantially reduced, and, animals in adjacent stalls can bring their bodies closer together when they desire to share their warmth and move apart when shared warmth is undesirable. Such behavioral thermoregulation results in less energy being dissipated to keep warm and thereby feed efficiency is noticeably increased.

By locating a source of water at one end of a pen and a source of feed at the opposite end and coupling this placement with the increased amount of body movement, concentration or accumulation of moist waste manure in one location is avoided or minimized. This permits the enclosed animals to sit or lie down in areas that are relatively clean thereby promoting improved hygiene and fewer instances of cystitis or other infections. Further, the improved cleanliness provides longer floor life.

The observation has been made that sows will manipulate the chains 44 deriving satisfaction and contentment from this diversion during their periods of occupancy.

It will be appreciated that various changes in detail may be made in the systems and components shown in the accompanying drawings and described in connection therewith by those skilled in the art without departing from the spirit and scope of the invention as defined in the claims.

What is claimed is:

1. A system for comfortably concentrating in individual stalls a group of elongated four-legged animals having as a group generally the same length and breadth comprising at least one row of elongated individual retention stalls arranged side-by-side and with each adjoining pair of stalls sharing a common vertical divider which comprises a fixed portion at one end to which a swingable portion is pivotally attached so as to be swingable from side-to-side, the width of each said stall when measured between adjacent ones of said fixed portions being sufficient to comfortably accommodate the breadths of said animals either standing or lying but insufficient to accommodate the lengths of said animals, and the length of each said stall being sufficient to comfortably lying, the swingable portions forming a widened space between adjacent ones of said swingable portions upon being forced apart by an enclosed animal being sufficient to allow said animal to turn around in the stall.

2. A system as called for in claim 1 wherein, each said fixed portion of a divider is substantially shorter than its said swingable portion.

3. A system as called for in claim 2 wherein each said swingable portion is at least about twice as long as the fixed portion on which it is swingably mounted.

4. A system as called for in claim 2 wherein each said swingable portion is approximately twice as long as the fixed portion on which it is swingably mounted.

5. A system as called for in claim 1 wherein said stall includes at least one means for opening and closing an end of each stall whereby an enclosed animal may be led into and out of the stall through the opening.

6. A system as called for in claim 5 wherein there are two rows of said stalls with the ends thereof opposite said openable ends being juxtaposed.

7. A system as called for in claim 6 wherein the stalls in each row have the same width and are aligned longitudinally with the stalls in the opposite row and each pair of juxtaposed ends has common closure means.

8. A system as called for in claim 7 wherein said common end closure means is partly attached to one row and partly attached to the other row thereby securing said rows together.

9. A system as called for in claim 1 wherein means are provided which limit the extent to which said swingable portions can swing.

10. A system as called for in claim 9 wherein a length of chain or cable attached at one end to each said swingable portion and attached at its opposite end to an adjacent fixed part of said system constitutes said limit means and the slack in said length of chain or cable determines the extent to which said swingable portion can be swung.

11. A system as called for in claim 10 wherein said length of chain or cable will withstand being chewed on by a confined animal.

12. A system as called for in claim 1 wherein feed holding means is located at one end of each stall and a source of water is located at the opposite end thereof.

* * * * *

UNITED STATES PATENT AND TRADEMARK OFFICE
CERTIFICATE OF CORRECTION

PATENT NO. : 4,919,080

DATED : April 24, 1990

INVENTOR(S) : Richard K. Balsbaugh

It is certified that error appears in the above-identified patent and that said Letters Patent is hereby corrected as shown below:

Column 4, line 22, delete "see" and insert --seen--.

Column 5, line 21, "nd" should read --and--.

Column 6, line 18, after "fortably", insert --accommodate the lengths of said animals either standing or--.

Signed and Sealed this

Second Day of July, 1991

Attest:

HARRY F. MANBECK, JR.

Attesting Officer

Commissioner of Patents and Trademarks